United States Patent
Pawlak et al.

(10) Patent No.: US 11,145,349 B1
(45) Date of Patent: Oct. 12, 2021

(54) PHYSICALLY UNCLONABLE FUNCTION ARCHITECTURE INCLUDING MEMORY CELLS WITH PARALLEL-CONNECTED ACCESS TRANSISTORS AND COMMON WRITE WORDLINES

(71) Applicant: GLOBALFOUNDRIES U.S. Inc., Malta, NY (US)

(72) Inventors: Bartlomiej J. Pawlak, Leuven (BE); Christian A. Witt, Overijse (BE)

(73) Assignee: GLOBALFOUNDRIES U.S. Inc., Malta, NY (US)

( * ) Notice: Subject to any disclaimer, the term of this patent is extended or adjusted under 35 U.S.C. 154(b) by 0 days.

(21) Appl. No.: 17/034,405

(22) Filed: Sep. 28, 2020

(51) Int. Cl.
  *G11C 11/16* (2006.01)
  *G11C 17/12* (2006.01)
  *G11C 11/4072* (2006.01)

(52) U.S. Cl.
  CPC ...... *G11C 11/1675* (2013.01); *G11C 11/1655* (2013.01); *G11C 11/1657* (2013.01); *G11C 11/1673* (2013.01); *G11C 11/4072* (2013.01); *G11C 17/12* (2013.01)

(58) Field of Classification Search
  None
  See application file for complete search history.

(56) References Cited

U.S. PATENT DOCUMENTS

| | | | |
|---|---|---|---|
| 8,525,549 B1 | 9/2013 | Feng et al. | |
| 9,805,816 B2 | 10/2017 | Jan et al. | |
| 9,953,727 B1 | 4/2018 | Fifield et al. | |
| 9,966,149 B2 | 5/2018 | Kim et al. | |
| 10,311,930 B1 | 6/2019 | Kim et al. | |
| 10,468,104 B1 | 11/2019 | Anand et al. | |

(Continued)

FOREIGN PATENT DOCUMENTS

| | | | |
|---|---|---|---|
| WO | 2016018503 A1 | 2/2016 | |
| WO | 2016160578 A1 | 10/2016 | |

OTHER PUBLICATIONS

Das et al., "MRAM PUF: Using Geometric and Resistive Variations in MRAM Cells", ACM Journal on Emerging Technologies in Computing Systems, vol. 13, No. 1, 2016, pp. 1-15.

(Continued)

*Primary Examiner* — J. H. Hur
(74) *Attorney, Agent, or Firm* — Gibb & Riley, LLC

(57) ABSTRACT

Disclosed is a memory cell including parallel-connected first access transistors and a first variable resistor in series between a bitline and a source line and parallel-connected second access transistors and a second variable resistor in series between the bitline and the source line. A write wordline controls one pair of first and second access transistors so that, during an initialization mode, the resistors are concurrently subjected to the same write bias conditions for one-time programming to switch from an unprogrammed state (where the resistors have the same first resistance state) to a programmed state (where one resistor has switched to a second resistance state and a bit is stored). Discrete first and second read wordlines control another pair of first and second access transistors to enable discrete read processes associated with the first and second variable resistors. Also disclosed are an associated circuit (e.g., a PUF) and a method.

20 Claims, 7 Drawing Sheets

(56) References Cited

U.S. PATENT DOCUMENTS

| | | | |
|---|---|---|---|
| 2003/0223283 A1* | 12/2003 | Kunikiyo | G11C 11/1655 365/200 |
| 2004/0160809 A1* | 8/2004 | Lin | G11C 11/16 365/158 |
| 2006/0209585 A1* | 9/2006 | Tanizaki | G11C 13/0004 365/148 |
| 2007/0268742 A1* | 11/2007 | Liu | G11C 11/16 365/163 |
| 2008/0308887 A1* | 12/2008 | Asao | H01L 27/228 257/421 |
| 2011/0002163 A1* | 1/2011 | Fukami | G11C 11/1675 365/173 |
| 2013/0182501 A1* | 7/2013 | Sakimura | G11C 11/1659 365/158 |
| 2013/0242638 A1* | 9/2013 | Takashima | G11C 11/1675 365/148 |
| 2016/0225429 A1* | 8/2016 | Toh | G11C 11/1675 |
| 2017/0053705 A1 | 2/2017 | Agarwal et al. | |
| 2017/0214532 A1 | 7/2017 | Das et al. | |
| 2018/0191512 A1 | 7/2018 | Tomishima | |
| 2020/0194048 A1 | 6/2020 | Roy et al. | |

OTHER PUBLICATIONS

Lim et al., "Highly Independent MTJ-Based PUF System Using Diode-Connected Transistor and Two-Step Postprocessing for Improved Response Stability", IEEE Transactions on Information Forensics and Security, vol. 15, 2020, pp. 2798-2807.

Vatajelu et al., "STT MRAM-Based PUFs", Design, Automation & Test Europe Conference & Exhibition, 2015, 872-875.

Srivastava et al., "Magnetic Immunity of Spin-Transfer-Torque MRAM", Applied Physics, vol. 114, 172405, 2019, pp. 172405-1-172405-5.

Chien et al., "STT-DPSA: Digital PUF-Based Secure Authentication Using STT-MRAM for the Internet of Things", MDPI Micromachines 11, 502, 2020, pp. 1-28.

Gao et al., "Emerging Physical Unclonable Functions with Nanotechnology", IEEE Access, 2015, pp. 1-19.

Sadana et al., "A Highly Reliable and Unbiased PUF Based on Differential OTP Memory", IEEE Electron Device Letters, vol. 39, No. 8, 2018, pp. 1159-1162.

Zhang et al. "Highly Reliable Memory-Based Physical Unclonable Function Using Spin-Transfer Torque MRAM", IEEE International Symposium on Circuits and Systems (ISCAS), 2014, pp. 1-4.

\* cited by examiner

PARALLEL/LOW RESISTANCE STATE
(LOGIC "0")

ANTI-PARALLEL/HIGH RESISTANCE STATE
(LOGIC "1")

PHYSICALLY UNCLONABLE FUNCTION ARCHITECTURE INCLUDING MEMORY CELLS WITH PARALLEL-CONNECTED ACCESS TRANSISTORS AND COMMON WRITE WORDLINES

BACKGROUND

Field of the Invention

The present invention relates to physically unclonable functions (PUFs) and, more particularly, to a PUF architecture and method.

Description of Related Art

With the ever-increasing use of Internet of Things (IoT) objects, wireless communications and data are becoming more and more vulnerable to a wide range of security threats. To protect against such security threats, Physically Unclonable Functions (PUFs) have been developed for cryptography (e.g., encryption and decryption), advanced authentication, etc. Generally, a PUF is a hardware-implemented random number generator. Ideally, a PUF will consistently generate and output the exact same random number (i.e., the exact same unique bitstring) in response to repeated challenges. Unfortunately, with current on-chip PUF architectures, variations in operating conditions (e.g., temperature variations, voltage variations, etc.) can make it difficult to repeatedly and consistently generate the exact same random number without also applying less secure postprocessing algorithms.

SUMMARY

Disclosed herein are embodiments of a memory cell. The memory cell can include multiple variable resistors including a first variable resistor and a second variable resistor. The memory cell can further include multiple transistors including two parallel-connected first access transistors and two parallel-connected second access transistors. The first access transistors and the first variable resistor can be connected in series between a bitline and a source line. The second access transistors and the second variable resistor can be connected in series between the same bitline and source line. Finally, the gates of the first access transistors can be connected to a common write wordline and to a first read wordline, respectively, and the gates of the second access transistors can be connected to the same common write wordline and to a second read wordline, respectively.

Also disclosed herein are embodiments of an on-chip circuit (e.g., Physically Unclonable Function (PUF)), which includes an array of such memory cells arranged in columns and rows. That is, each memory cell in the memory array can include multiple variable resistors including a first variable resistor and a second variable resistor. Each memory cell in the memory array can also include multiple transistors including two parallel-connected first access transistors and two parallel-connected second access transistors. The first access transistors and the first variable resistor can be connected in series between a bitline and a source line for a column containing the memory cell. The second access transistors and the second variable resistor can be connected in series between the same bitline and source line for the column. Finally, the gates of the first access transistors can be connected to a common write wordline and to a first read wordline, respectively, for a row containing the memory cell and the gates of the second access transistors can be connected to the same common write wordline and to a second read wordline, respectively, for the row.

Also disclosed herein are method embodiments for operating the above-described structures. The method embodiments can include providing an on-chip circuit (e.g., Physically Unclonable Function (PUF)). This circuit can include a memory array with memory cells arranged in columns and rows. Each memory cell in the memory array can include multiple variable resistors including a first variable resistor and a second variable resistor. Each memory cell in the memory array can further include multiple transistors including two parallel-connected first access transistors and two parallel-connected second access transistors. The first access transistors and the first variable resistor can be connected in series between a bitline and a source line for a column containing the memory cell. The second access transistors and the second variable resistor can be connected in series between the same bitline and source line for the column. Finally, the gates of the first access transistors can be connected to a common write wordline and to a first read wordline, respectively, for a row containing the memory cell and the gates of the second access transistors can be connected to the same common write wordline and to a second read wordline, respectively, for the same row. The method embodiments can further include operating each memory cell in the memory array in an initialization mode. Operating a memory cell in the initialization mode can include causing a write process to be performed in order to achieve one-time programming of the memory cell from an unprogrammed state to a random programmed state. To cause the write process, write bias conditions can be applied on the bitline and the source line connected the memory cell and the common write wordline connected to the memory cell can be activated such that, in response to the write bias conditions and activation of the common write wordline and further given the probable existence of random process variations in the memory cell, the memory cell switches from the unprogrammed state to the random programmed state.

BRIEF DESCRIPTION OF THE SEVERAL VIEWS OF THE DRAWINGS

The present invention will be better understood from the following detailed description with reference to the drawings, which are not necessarily drawn to scale and in which.

DETAILED DESCRIPTION

As mentioned above, Physically Unclonable Functions (PUFs) have been developed for cryptography (e.g., encryption and decryption), advanced authentication, etc. Generally, a PUF is a hardware-implemented random number generator. Ideally, a PUF will consistently generate and output the exact same random number (i.e., the exact same unique bitstring) in response to repeated challenges. Unfortunately, with current on-chip PUF architectures, variations in operating conditions (e.g., temperature variations, voltage variations, etc.) can make it difficult to repeatedly and consistently generate the exact same random number without also applying less secure postprocessing algorithms.

Figure 1:
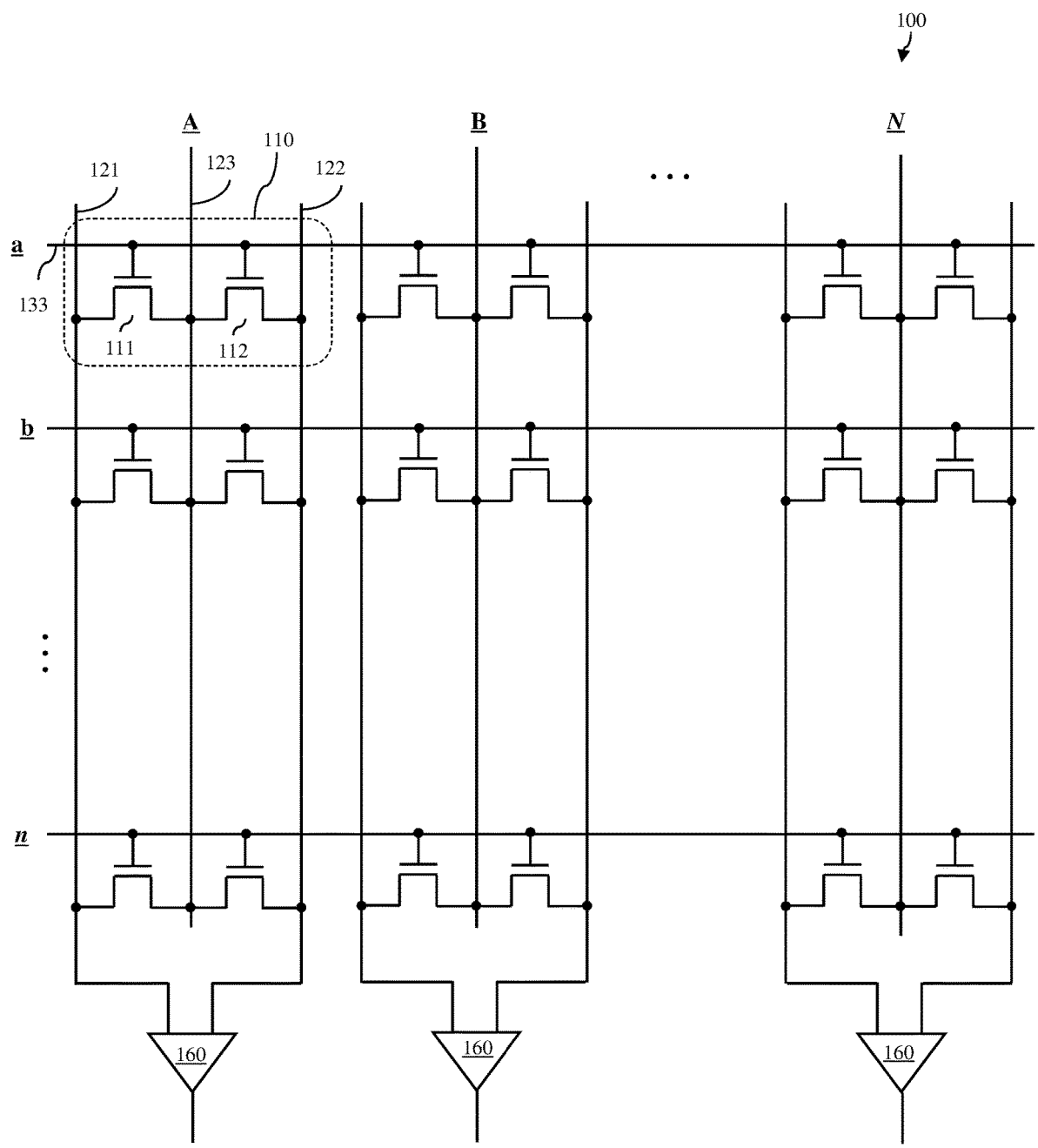
FIG. 1 is a schematic diagram illustrating an exemplary prior art Physically Unclonable Function (PUF)

For example, FIG. 1 is a schematic diagram illustrating the architecture of an exemplary prior art PUF 100. This PUF 100 includes an array of memory cells 110 arranged in columns and rows. Each memory cell 110 in the array includes a pair of n-type field effect transistors (NFETs) 111-112 connected in series between a pair of bitlines 121-122, respectively, for a column containing the cell. A junction between the NFETs 111-112 is connected to a common source line (CSL) 123 for the column. Additionally, the gates of both of the NFETs 111-112 are connected to a common wordline (CWL) 133 for a row containing the cell. The NFETs 111-112 are typically manufactured according to the exact same design. However, due to random process variations, which naturally occur during manufacturing (e.g., variations in channel length and width, dopant concentration fluctuations in the channel, differences in the amount of charge stored in the gate dielectric, etc.), the NFETs 111-112 have different threshold voltages (i.e., VT1 and VT2, respectively). As a result, when the CWL 133 connected to a selected memory cell 110 is activated (i.e., raised to VDD) and the CSL 123 connected to the selected memory cell 110 is pre-charged during a read operation (also referred to herein as a sense operation), one of the NFETs 111-112 within the selected memory cell 110 will switch ON before the other and a read current (Iread) will flow from the CSL 123 through that ON NFET to the corresponding bitline for the column. Specifically, if NFET 111 switches ON first, Iread will flow from the CSL 123 through the NFET 111 to BL 121 such that the current flow on BL121 will be greater than the current flow on BL122; whereas if NFET 112 switches ON first, Iread will flow from the CSL 123 through the NFET 112 to the BL 122 such that current flow on BL122 will be greater than current flow on BL121. A comparator 160 at the end of the column receives inputs from the BLs 121-122 and can compare the current flow on each to identify which NFET within the memory cell switched ON first. Depending upon which NFET in the selected memory cell switches ON first, the selected memory cell 110 will be read out as storing a bit with either a logic value of 0 (e.g., if NFET 111 has the lower threshold voltage (VT1<VT2) and turns ON first) or a bit with a logic value of 1 (e.g., if NFET 112 has the lower threshold voltage (VT1>VT2) and turns ON first). In response to a challenge to the PUF, the bits stored in all the memory cells in the array are in sequence, thereby outputting a unique bitstring (i.e., a random number).

Figure 2A:
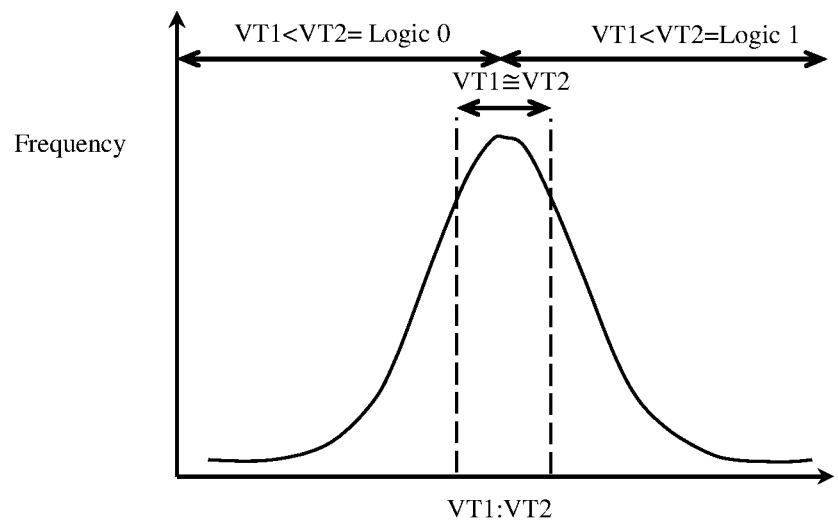
FIGS. 2A and 2B are graphs illustrating that, with the PUF of FIG. 1, the threshold voltages of the transistors in the memory cell may be so similar that, given different operating conditions, repeated and consistent generation of the same random number is not achievable.
Figure 2B:
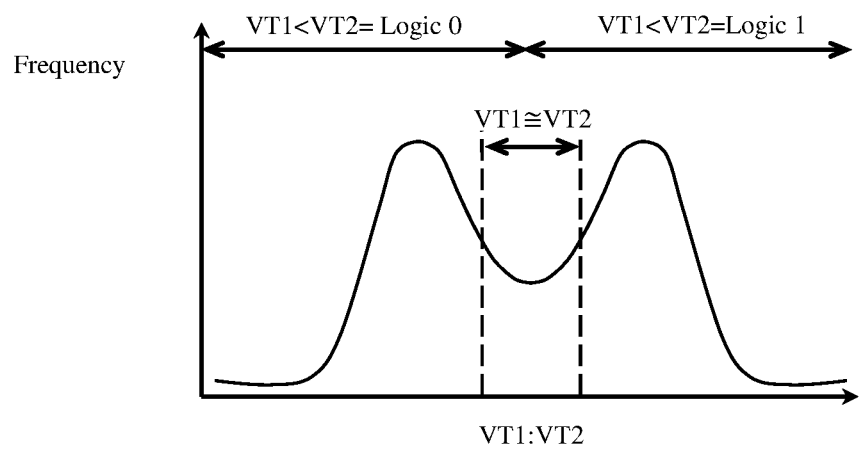

FIGS. 2A and 2B are graphs illustrating that, with the prior art PUF 100 shown in FIG. 1, variations in operating conditions (e.g., temperature variations, voltage variations, etc.) can make it difficult to repeatedly and consistently generate the exact same random number.

Specifically, FIG. 2A is a graph illustrating a probability distribution indicating the frequency at which different memory cells 110 in the PUF 100 will have different VT1:VT2 combinations. As discussed above, any memory cell where VT1<VT2 will output a bit with a logic value of 0 during a read operation and any memory cell where VT1>VT2 will output a bit with a logic value of 1 during a read operation. Since design and manufacturing of NFETs are typically optimized to minimize across chip threshold voltage variations, most memory cells will have NFETs where VT1 and VT2 are very similar such that VT1-VT2 is only slightly negative or only slightly positive (see the peak of the probability distribution) and only a few memory cells will have NFETs where VT1 is either significantly less than VT2 (see the left-side end of the probability distribution) or significantly greater than VT2 (see the right-side end of the probability distribution). However, using NFETs with similar threshold voltages in a PUF becomes problematic because threshold voltages can vary with variations in operating conditions (e.g., with variations in operating temperature and/or operating voltage). For each memory cell where the NFETs have similar threshold voltages (i.e., where VT1≅VT2), change(s) in the operating conditions between the initial read operation and a later read operation can cause VT1 and/or VT2 to shift such that VT1 is no longer greater than VT2 or vice versa. As a result, the bitstring output during the later read operation will be different from the bitstring output during the initial read operation.

Techniques have been developed for reducing the peak at the center of the probability distribution and, particularly, for reducing the frequency of memory cells where the NFETs have similar threshold voltages (i.e., where VT1≅VT2) improve the likelihood that the exact same random number will be repeatedly and consistently output in response to each challenge. One exemplary technique for reducing the peak at the center of the probability distribution includes performing the initial read operation during which the bits stored in each memory cell are read out in sequence so as to generate a bitstring (i.e., a random number), temporarily storing the bitstring elsewhere (e.g., in a buffer) and, then, rewriting that same bitstring back into the memory cells. During the rewrite process, each bit is rewritten into the memory cell in such a way as to force a significant number of electrons into the gate dielectric layer of the NFET with the higher threshold voltage and, thereby to further increase the difference between VT1 and VT2. While this technique reduces the likelihood that memory cells within the array may have NFETs where VT1≅VT2, it does not eliminate the likelihood all together (as shown in the graph of FIG. 2B). Furthermore, the added complexity associated with offloading the bitstring to a buffer and then rewriting it back into the memory cells may lead to write errors.

In view of the foregoing, disclosed herein are embodiments of a memory cell. The memory cell can include two parallel-connected first access transistors and a first variable resistor (or, alternatively, multiple parallel-connected first variable resistors) connected in series between a bitline and a source line and also two parallel-connected second access transistors and a second variable resistor (or, alternatively, multiple parallel-connected second variable resistors) connected in series between the bitline and the source line. A common write wordline can control the gates of one first access transistor and one second access transistor so that the first and second variable resistors can be concurrently subjected to the same limited write bias conditions during one-time programming, which is designed, given the probable existence of random process variations, to switch fewer than all of the variable resistors from a high resistance state to a low resistance state and thereby store a bit. Discrete read wordlines can control the gates of the other first access transistor and the other second access transistor to allow for selective read processes. Also disclosed herein are embodiments of an on-chip circuit (e.g., a PUF), which includes an array of the memory cells and which can be employed to generate a random number (i.e., a unique bitstring) by reading out stored bits from the memory cells in sequence. Also disclosed herein are associated method embodiments.

Figure 3A:
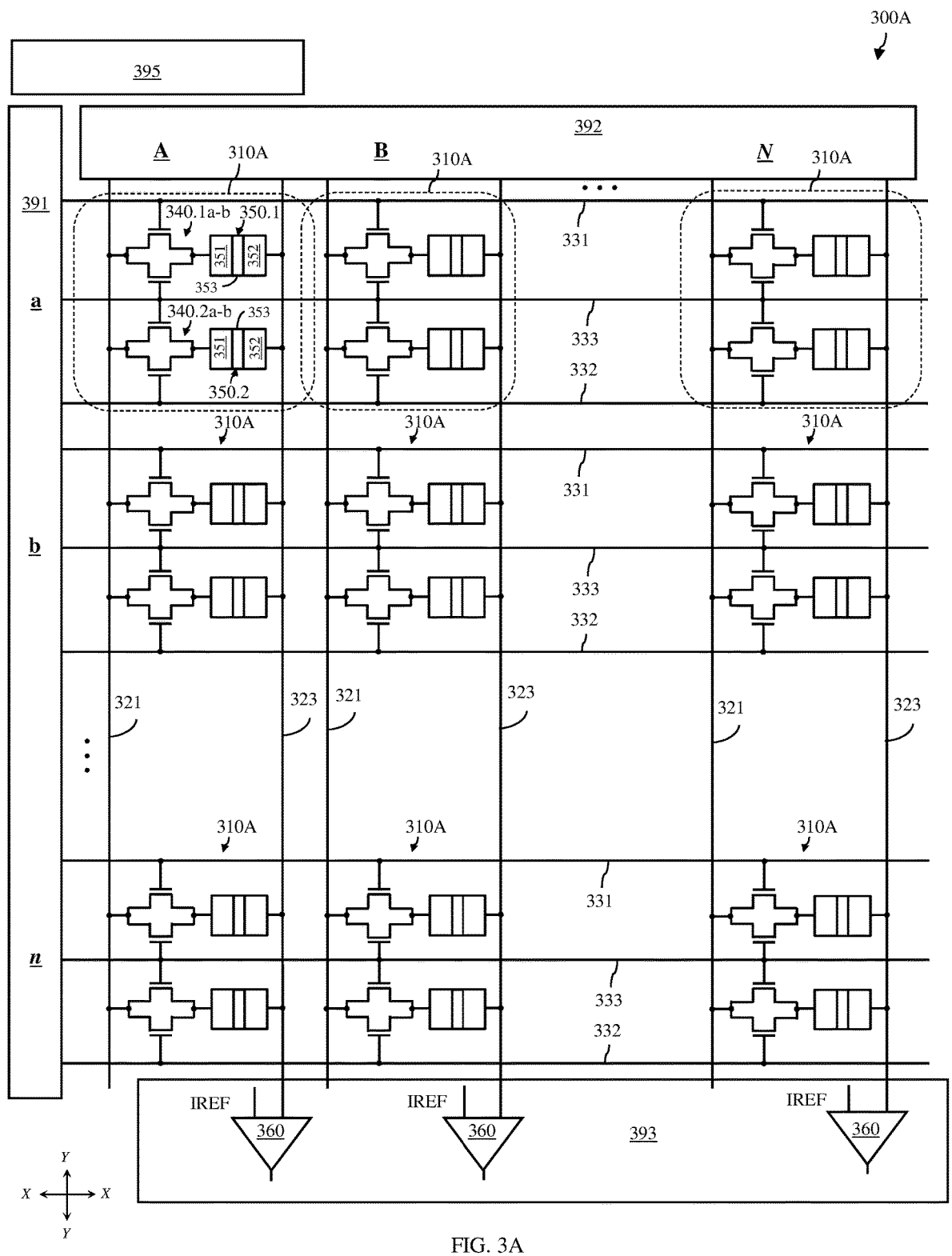
FIG. 3A is a schematic diagram illustrating an embodiment of a memory cell and a circuit (e.g., a PUF) that includes an array of such memory cells.
Figure 3B:
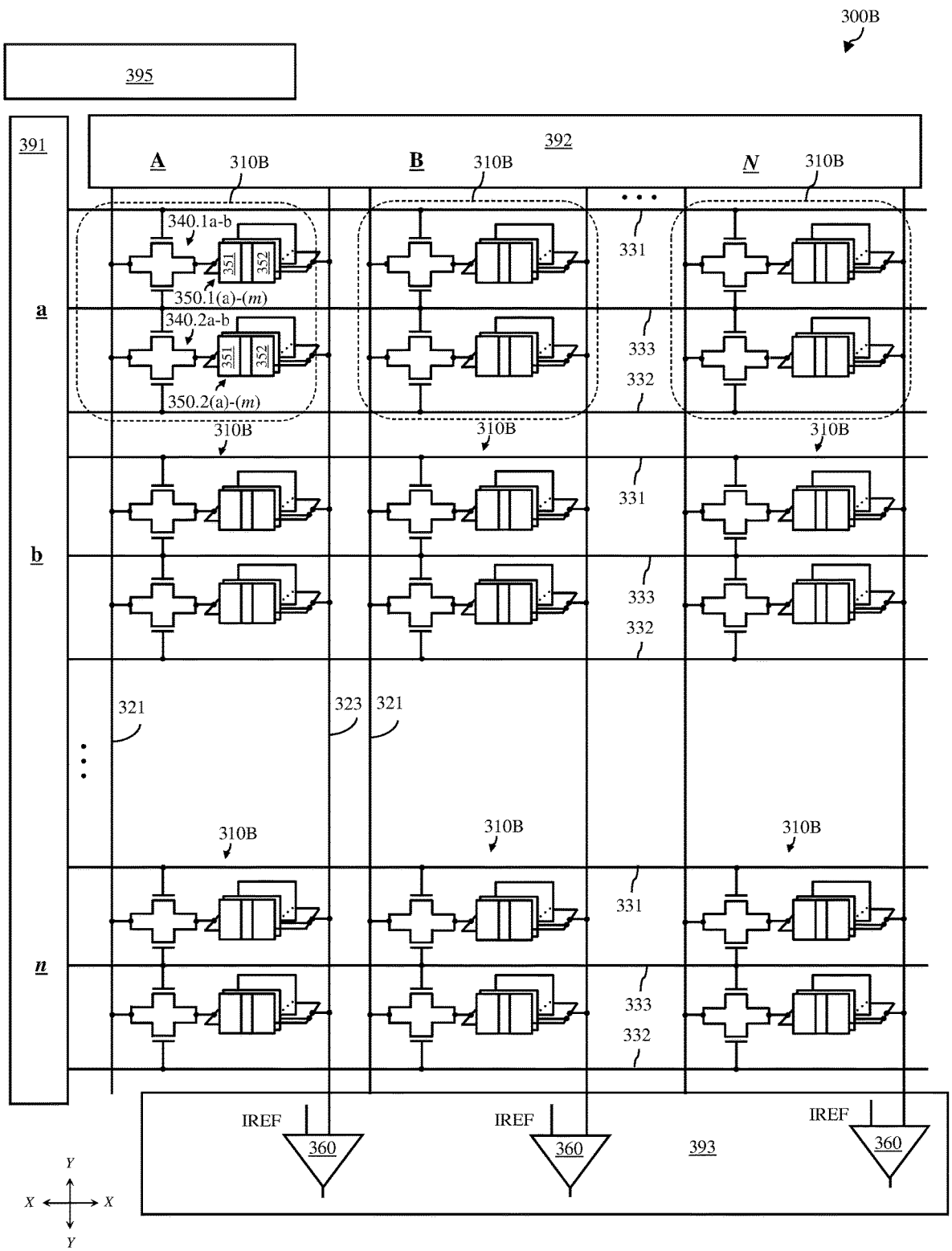
FIG. 3B is a schematic diagram illustrating an alternative embodiment of a memory cell and a circuit (e.g., a PUF) that includes an array of such memory cells.

More particularly, FIGS. 3A and 3B are schematic diagrams illustrating embodiments of an on-chip circuit 300A, 300B (e.g., a PUF)) and embodiments of a memory cell 310A (see FIG. 3A), 310B (see FIG. 3B) incorporated into the on-chip circuit 300A, 300B, respectively. The circuit 300A, 300B can include a memory array with multiple memory cells 310A, 310B, which are arranged in columns A-N and rows a-n and which are randomly programmable.

The circuit 300A, 300B can further include bitlines 321 and source lines 323 for the columns and all the memory cells 310A, 310B in the same column can be connected to the bitline 321 and the source line 323 for that column. The circuit 300A, 300B can also include multiple wordlines (including a common write wordline 333, a first read wordline 331 and a second read wordline 332) for the rows and all of the memory cells 310A, 310B in the same row can be connected to the wordlines for that row.

It should be understood that columns and rows of memory cells refer to memory cells that are arranged essentially linearly with first lines of the cells in the array being oriented in a first direction, with second lines of the cells in the array being oriented in a second direction that is essentially perpendicular to the first direction, and with each cell being located at the intersection of one first line and one second line. For purposes of illustration, FIGS. 3A and 3B show the columns as well as the bitlines and source lines associated with the columns oriented in the Y-direction and further show the rows as well as the wordlines associated with the rows oriented in the X-direction. However, it should be understood that the figures are not intended to be limiting and that, alternatively, the columns, bitlines and source lines could be oriented in the X-direction and the rows and wordlines could be oriented in the Y-direction.

The circuit 300A, 300B can further include a controller 395 and peripheral circuitry 391-392, which is in communication with the controller 395 and configured to operate in response to control signals from the controller 395. The peripheral circuitry 391 can be electrically connected to the wordlines for the rows and can include, for example, address decode logic and drivers for activating and deactivating selected wordlines (i.e., for switching selected wordlines from low to high voltage levels and back) depending upon the mode of operation (as discussed below). Peripheral circuitry 392 can be electrically connected to the bitlines and source lines for the columns and can include column address decode logic and drivers for appropriately biasing selected bitlines and source lines depending upon the mode of operation (as discussed below). The circuit 300A, 300B can further include a sense circuit 393 in communication with the controller 395 and configured to perform sense/compare processes depending upon the mode of operation (as discussed below). Controllers, peripheral circuitry and sense circuits employed for memory array operations are well known in the art. Thus, the details thereof have been omitted from this specification in order to allow the reader to focus on the salient aspects of the disclosed embodiments.

The memory cells 310A, 310B can be configured so that they are randomly programmable. Specifically, each memory cell 310A, 310B can be a twin-cell memory cell (also referred to herein as a dual-cell memory cell) that includes a first cell section, which is connected between a bitline and a source line for a column, and a second cell section, which is connected the same bitline and the same source line for the column. More specifically, each memory cell 310A, 310B can include multiple two-terminal variable resistors including one or more first variable resistors in the first cell section and one or more second variable resistors in the second cell section.

For example, as illustrated in FIG. 3A, each memory cell 310A can include one first variable resistor 350.1, which has a first terminal at one end and a second terminal at the opposite end, in the first cell section and one second variable resistor 350.2, which similarly has a first terminal at one end and a second terminal at the opposite end, in the second cell section.

Alternatively, as illustrated in FIG. 3B, each memory cell 310B can include multiple parallel-connected first variable resistors 350.1(a)-(m) in the first cell section and multiple parallel-connected second variable resistors 350.2(a)-(m) in the second cell section. In this case, each first variable resistor and each second variable resistor can have a first terminal at one end and a second terminal at the opposite end. The first variable resistors 350.1(a)-(m) can be parallel-connected. That is, the first terminals of all the first variable resistors 350.1(a)-(m) can be electrically connected at a first terminal junction and the second terminals of all the first variable resistors 350.1(a)-(m) can also be electrically connected at a second terminal junction. Similarly, the second variable resistors 350.2(a)-(m) can be parallel-connected. That is, the first terminals of all the second variable resistors 350.2(a)-(m) can be electrically connected at a first terminal junction and the second terminals of all the second variable resistors 350.2(a)-(m) can also be electrically connected at a second-terminal junction. For purposes of illustration, three parallel-connected first variable resistors 350.1(a)-(m) and three parallel-connected second variable resistors 350.2(a)-(m) are shown in each memory cell 310B. However, it should be understood that the figures are not intended to be limiting and that, alternatively, each memory cell 310B could include any number of two or more parallel-connected first variable resistors and the same number of two or more parallel-connected second variable resistors.

For purposes of this disclosure, a two-terminal variable resistor refers to a device that is switchable between multiple resistance states. For example, a two-terminal variable resistor can switch between a first resistance state (e.g., a high resistance state, which is characterized by the device having a resistance above a specific high resistance level) and a second resistance state (e.g., a low resistance state, which is characterized by the device having a resistance below a specific low resistance level that is lower than the specific high resistance level) depending upon write bias conditions applied to the first and/or second terminals of the device. All of the two-terminal variable resistors in each memory cell 310A, 310B can be the same type of two-terminal variable resistor and can be manufactured according to the same design.

Figure 4A:
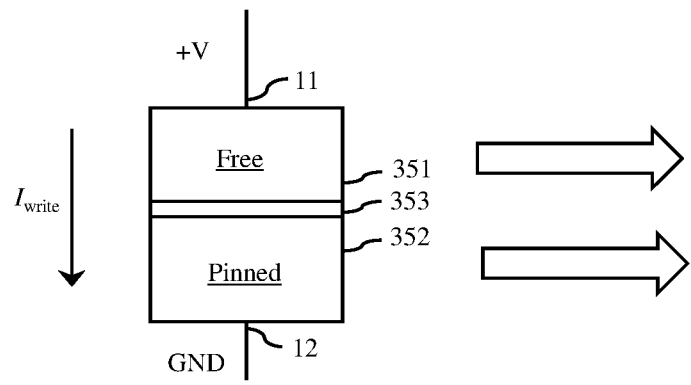
FIGS. 4A and 4B are cross-section diagrams of an exemplary spin transfer torque-type magnetic tunnel junction in a parallel state and anti-parallel state, respectively.
Figure 4B:
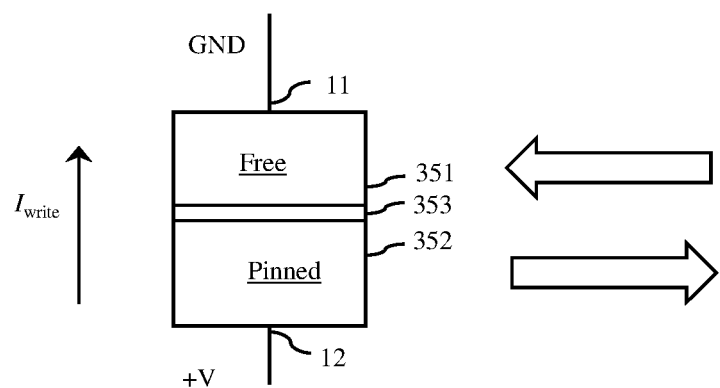

In some embodiments, the two-terminal variable resistors in each memory cell 310A, 310B are spin transfer torque-type magnetic tunnel junctions (STT-MTJs). Those skilled in the art will recognize that an STT-MTJ is typically a back-end-of-the-line (BEOL) multi-layer variable resistor structure. That is, it is a multi-layer structure formed in the BEOL metal levels of a chip above the front-end-of-the-line (FEOL) devices (e.g., semiconductor devices, etc.). As illustrated in FIGS. 4A and 4B, an STT-MTJ can include a thin dielectric layer 353 (also referred to as a tunneling barrier layer) between a free ferromagnetic layer 351 (also referred to herein as a free layer or a data store layer) at a first terminal 11 and a pinned ferromagnetic layer 352 (also referred to herein as a pinned layer or a fixed ferromagnetic layer) at a second terminal 12. The thin dielectric layer 353 can be, for example, a thin oxide layer, such as a magnesium oxide (MgO) layer, an aluminum oxide ($Al_2O_3$) layer (also referred to as alumina) or a bismuth ferrite ($BiFeO_3$, also referred to as BFO) layer. The free ferromagnetic layer 351 can be, for example, a cobalt (Co), iron (Fe), boron (B) alloy layer. The pinned ferromagnetic layer 352 can be, for example, a gadolinium (Gd), iron (Fe), and cobalt (Co) alloy layer.

An STT-MTJ is switchable between two resistance states including an antiparallel resistance (RAP) state (also referred to as a high resistance state) and a parallel resistance (RP) state (also referred to as a low resistance state) depending upon the write bias conditions applied to the first terminal 11 and the second terminal 12. In the RAP state, the resistance of the STT-MTJ will be above some specific high resistance level. In the RP state, the resistance of the same STT-MTJ will be below some specific low resistance level, which is lower than the high resistance level. During a conventional RAP to RP write process in an STT-MTJ, a positive voltage pulse is applied to the first terminal 11 (i.e., to the free ferromagnetic layer 311) and the second terminal 12 (i.e., the pinned ferromagnetic layer 352) is discharged to GND (e.g., at 0V) so that a write current (Iwrite) flows through the device from the first terminal toward the second terminal in the direction of the pinned ferromagnetic layer 352 to switch the free ferromagnetic layer 351 to the RP state (i.e., the low resistance state) (see FIG. 4A). During a conventional RP to RAP write process in an STT-MTJ, a positive voltage pulse is applied to the second terminal 12 (i.e., to the pinned ferromagnetic layer 352) and the first terminal 11 is discharged to ground (GND) (e.g., at 0V) so that write current (Iwrite) flows through the STT-MTJ from the second terminal toward the first terminal in the direction of the free ferromagnetic layer 351 to switch the free ferromagnetic layer 351 to the RAP state (i.e., the high resistance state) (see FIG. 4B). The voltage level and duration are typically selected so that, given the design of the STT-MJT, the positive voltage pulse is at a sufficiently high level and applied for a sufficiently long duration to ensure that the desired switching will occur in most, if not all, of STT-MTJs that are manufactured according to the design, regardless of any process variations.

It should be understood that, in other embodiments, different types of two-terminal variable resistors could, alternatively, be incorporated into the memory cell 310A, 310B. Such variable resistors can include, but are not limited to, phase change memory (PCM)-type variable resistors and memristors.

Those skilled in the art will recognize that a PCM-type variable resistor employs a phase change material (e.g., a chalcogenide compound) with two different programmable structural phases. The phases include a low resistivity (high conductivity) crystalline phase and a high resistivity (low conductivity) amorphous phase. Switching of the phase is dependent upon the local temperature, which is controlled by the length and strength of an applied voltage on the first and/or second terminals. Those skilled in the art will recognize that a memristor includes two metal layers and separated by a dielectric layer (e.g., hafnium oxide ($HfO_x$) or some other suitable oxide layer, also referred to as a switching layer).

Those skilled in the art will recognize that a memristor is a variable resistor that can be configured so that it is switchable between two resistance states or, alternatively, so that it is switchable between more than two resistance states. For example, in some memristors, depending upon write bias conditions applied to the first and/or second terminals, ions in the dielectric layer may migrate to: (a) break-up a conductive filament that extends through the dielectric layer between the metal layers so that the memristor is in a high resistance state or (b) grow a conductive filament in the dielectric layer such that it extends between the metal layers so that the memristor is in a low resistance state. In other memristors, depending upon write bias conditions applied to the first and/or second terminals, three or more different resistance states are possible.

In any case, those skilled in the art will recognize that different types of variable resistors have different write bias conditions for switching resistance states.

For purposes of illustration, the memory cells 310A, 310B are described in greater detail below and illustrated in the drawings as incorporating variable resistors with two resistance states and, more particularly, as incorporating STT-MTJs.

In any case, each memory cell 310A, 310B can further include multiple access transistors including two parallel-connected first access transistors 340.1a-b in the first cell section and two parallel-connected second access transistors 340.2a-b in the second cell section. The access transistors can all be, for example, n-type field effect transistors (NFETs).

In each memory cell 310A, 310B in a given column and row, the parallel-connected first access transistors 340.1a-b and the first variable resistor 350.1 (or, if applicable, the parallel-connected first variable resistors 350.1(a)-(m)) in the first cell section can be connected in series between the bitline 321 and the source line 323 for the column. That is, each first access transistor 340.1a-b can have a first source/drain region and a second source/drain region. The first source/drain regions of the two first access transistors 340.1a-b can be electrically connected and the second source/drain regions of the two first access transistors 340.1a-b can also be electrically connected such that the two first access transistors are parallel-connected. The first source/drain regions of the two first access transistors 340.1a-b can be electrically connected to the bitline 321 and the second source/drain regions of the two first access transistors 340.1a-b can be electrically connected to first terminal of the first variable resistor 350.1 (or, if applicable, to the first terminal junction of parallel-connected first variable resistors 350.1(a)-(m)). The second terminal of the first variable resistor 350.1 (or, if applicable, the second terminal junction of parallel-connected first variable resistors 350.1(a)-(m)) can be electrically connected to the source line 323.

The parallel-connected second access transistors 340.2a-b and the second variable resistor 350.2 (or, if applicable, the parallel-connected second variable resistors 350.2(a)-(m)) in the second cell section can be connected in series between the same bitline 321 and the same source line 323 for the column. That is, each second access transistor 340.2a-b can have a first source/drain region and a second source/drain region and the first source/drain regions of the two second access transistors 340.2*a-b* can be electrically connected and the second source/drain regions of the two second access transistors 340.2*a-b* can also be electrically connected such that the two second access transistors are parallel-connected. The first source/drain regions of the two second access transistors 340.2*a-b* can be electrically connected to the bitline 321. The second source/drain regions of the two second access transistors 340.2*a-b* can be electrically connected to first terminal of the second variable resistor 350.2 (or, if applicable, to the first terminal junction of parallel-connected second variable resistors 350.2(*a*)-(*m*)). The second terminal of the second variable resistor 350.2 (or, if applicable, the second terminal junction of parallel-connected second variable resistors 350.2(*a*)-(*m*)) can be electrically connected to the source line 323. For STT-MTJs, as discussed above and illustrated in FIGS. 4A-4B, the first terminal 11 is at the free ferromagnetic layer 351 and the second terminal 12 is at the pinned ferromagnetic layer 352.

Additionally, in each memory cell 310A, 310B in a given column and row, the gates of the two parallel-connected first access transistors 340.1*a-b* can be connected to the common write wordline 333 and to the first read wordline 331, respectively, for the row. The gates of the two parallel-connected second access transistors 340.2*a-b* can be connected to the same common write wordline 333 and to a second read wordline 332, respectively, for the row.

As discussed in greater detail below, by connecting the gates of one first access transistor and one second access transistor (e.g., see the gates of the first access transistor 340.1*a* and the second access transistor 340.2*a*) in a memory cell 310A, 310B to the same common write wordline 333, the first variable resistor 350.2 (or, if applicable, the group of parallel-connected first variable resistors 350.1(*a*)-(*m*)) and the second variable resistor 350.2 (or, if applicable, the group of parallel-connected second variable resistors 350.12(*a*)-(*m*)) can be concurrently be subjected to the same write bias conditions during a write process. Also as discussed in greater detail below, by connecting the gates of the other first access transistor and the other second access transistor (e.g., see the gates of the first access transistor 340.1*b* and the second access transistor 340.2*b*) to different read wordlines (i.e., the first read wordline 331 and the second read wordline 332, respectively), the first variable resistor (or, if applicable, the group of parallel-connected first variable resistors 350.1(*a*)-(*m*)) and the second variable resistor (or, if applicable, the group of parallel-connected second variable resistors 350.2(*a*)-(*m*)) can be selectively subjected to read bias conditions for discrete read processes. In other words, in each memory cell 310A, 310B, write circuitry (including a first access transistor in the first cell section and having a gate controlled by a common write wordline and a second access transistor in the second cell section and having a gate controlled by the same common write wordline) enables the first variable resistor(s) and the second variable resistor(s) to be concurrently subjected to the same write bias conditions. Additionally, in each memory cell 310A, 310B, first read circuitry (including another first access transistor in the first cell section and having a gate controlled by a first read wordline) enables a first read process associated with the first variable resistors(s) only and separate second read circuitry (including another second access transistor in the second cell section and having a gate controlled by a second read wordline) enables a second read process associated with the second variable resistor(s) only.

More specifically, the circuit 300A, 300B can be configured to be employed as a PUF for consistently generating and outputting the exact same random number (i.e., the exact same unique bitstring) in response to repeated challenges.

To accomplish this, the controller 395 can be configured to selectively operate each memory cell 310A, 310B in an initialization mode for initialization processing prior to selectively operating the memory cells in an operational read-only mode for bitstring generation.

Operation of a selected memory cell 310A, 310B in the initialization mode can include causing a write process to be performed in the selected memory cell 310A, 310B in order to achieve one-time programming of that memory cell from an unprogrammed state with no stored bit to a random programmed state with a stored bit (where the 0 or 1 logic value of the stored bit is a function of random process variations and, thus, random and unknowable prior to completion of the one-time programming).

That is, in the unprogrammed state, the multiple variable resistors of a memory cell can all have the same first resistance state so that no bit is stored therein. For example, consider STT-MTJs which are typically manufactured on a chip in a manner that results in all of the STT-MTJs initially being in the RAP state. Thus, when the memory cells 310A, 310B of the circuit 300A, 300B incorporate STT-MTJs as the variable resistors, each memory cell 310A, 310B will initially have an unprogrammed state with all of the STT-MTJs being in the RAP state or, more particularly, in the same high resistance state with resistances above a specific high resistance level.

To cause the write process to be performed in a selected memory cell 310A, 310B, limited write bias conditions (as discussed in greater detail below) can be applied to the bitline 321 and the source line 323, which are connected to the selected memory cell, and the common write wordline 333 connected to the selected memory cell can be activated (i.e., a high positive voltage, such as VDD, can be applied to the common write wordline 333) in order to concurrently turn on one first access transistor 340.1*a* and one second access transistor 340.2*a* and, thereby concurrently apply the limited write bias conditions to the first variable resistor 350.1 (or, if applicable, to the parallel-connected first variable resistors 350.1(*a*)-(*m*)) and to the second variable resistor 350.2 (or, if applicable, to the parallel connected second variable resistors 350.2(*a*)-(*m*)). During this write process, the first read wordline 331 and the second read wordline 332 can remain deactivated (e.g., discharged to ground) so that the other first and second access transistors 340.1*b* and 340.2*b* remain turned off. For a memory cell 310A, the limited write bias conditions can be predetermined, given the likely existence of random process variations, so that they cause only the first variable resistor 350.1 or the second variable resistor 350.2, but not both, to switch resistance states to a second resistance state that is different from the first resistance state. For a memory cell 310B, the limited write bias conditions can be predetermined, given the likely existence of random process variations, so that at least one of the first variable resistors 350.1(*a*)-(*m*) or at least one of the second variable resistors 350.2 (*a*)-(*m*), but not a combination of both first and second variable resistors, switch resistance states to the second resistance state.

For example, if the variable resistors in the memory cell 310A are STT-MTJs, then the limited write bias conditions can be predetermined so that the resistance state of either the first STT-MTJ or the second STT-MTJ switches to the RP state so as to have a resistance that is below a specific low resistance level (which is below the above-mentioned high resistance level associated with the RAP state). If the variable resistors in the memory cell 310B are STT-MTJs, then the limited write bias conditions can be predetermined so that ideally the resistance states of one or more of the first STT-MTJs or of one or more of the second STT-MTJs switches to the RP state (but not both first and second STT-MTJs). Thus, in either memory cell 310A, 310B, the limited write bias conditions can be selected so that the result of the programming process will be either: R1 of the first variable resistor(s) is less than R2 of the second variable resistor(s) or R1 of the first variable resistor(s) is greater than R2 of the second variable resistor(s).

As discussed above and illustrated in FIG. 4A, an STT-MTJ switches to the RP state when a positive voltage pulse is applied to the first terminal 11 (i.e., at the free ferromagnetic layer 351) and the second terminal 12 at the pinned ferromagnetic layer 352 is discharged to ground causing a write current (Iwrite) to flow through the device from the first terminal 11 to the second terminal 12. The voltage level and duration of the positive voltage pulse are predetermined so that, given the design of the STT-MTJ, the positive voltage pulse is at a sufficiently high level and applied for a sufficiently long duration to ensure that the Iwrite threshold for RAP to RP switching would be reached in most, if not all, STT-MTJs that are manufactured according to the design, regardless of any random process variations.

Contrarily, in the write process employed herein, which is designed to achieve one-time random programming of a selected memory cell, the write bias conditions are limited. Specifically, instead of using a positive voltage pulse that is at a sufficiently high voltage level for a sufficiently long duration to ensure that the Iwrite threshold required for RAP to RP switching is reached in all of the STT-MTJs of the memory cell regardless of any random process variations, the positive voltage pulse used should be at a relatively low voltage level for a relatively short period of time so that, given the likelihood of the existence of random process variations, the Iwrite threshold required for RAP to RP switching is reached in only one of the STT-MTJs. Specifically, random process variations in STT-MTJs that are manufactured according to the same design may result in STT-MTJs having different Iwrite thresholds for RAP to RP switching (e.g., ranging from relatively low Iwrite thresholds for quick switching to relatively high Iwrite thresholds for slow switching). The optimal positive voltage pulse (i.e., voltage level and duration) for causing RAP to RP switching in only one STT-MTJ within memory cell 310A, 310B when all of the STT-MTJs are concurrently subjected to the same write bias conditions can be predetermined though simulations given the probability distribution for Iwrite threshold variations due to random process variations.

For example, in a memory cell 310A with one first variable resistor 350.1 and one second variable resistor 350.2, the particular positive voltage pulse used can be one that will achieve an Iwrite amount close to the peak of an Iwrite threshold variation probability distribution so that it is likely that only one of the two variable resistors will have an Iwrite threshold above the actual Iwrite and the other will not and such that only one of the two variable resistors will switch from RAP to RP and the other will not. In a memory cell 310B with multiple parallel-connected first variable resistors 350.1(a)-(m) and multiple parallel-connected second variable resistors 350.2(a)-(m), a lower voltage level and/or shorter pulse duration could be employed because only one of 4 or more variable resistors within the memory cell 310B needs to switch from RAP to RP. It should be noted that the write process in the memory cell 310B could be deemed successful if more than one of the first variable resistors or more than one of the second variable resistors switch resistance states, but not if a combination of both first and second variable resistors switch resistance states.

Operation of a selected memory cell 310A, 310B in the initialization mode can also include causing discrete read processes to be performed in the selected memory cell in order to confirm success of the write process and, thereby confirm the status of the selected memory cell as being in the random programmed state.

Specifically, operation of the selected memory cell 310A, 310B in the initialization mode can include causing both a first read process and a second read process to be performed.

To cause the first read process to be performed, read bias conditions can be applied to the bitline 321 and the source line 323, which are connected to the selected memory cell. The read bias conditions can include a relatively low positive voltage on the bitline 321 and discharging of the source line 323. The first read wordline 331 connected to the selected memory cell can be activated (i.e., a high positive voltage, such as VDD, can be applied to the first read wordline 331) in order to turn on the first access transistor 340.1b. All other read wordlines connected to the selected memory cell can be deactivated (e.g., discharged to ground) such that the other access transistors within the selected memory cell are all turned off. When the first variable resistor 350.1 (or, if applicable, any of the parallel-connected first variable resistors 350.1(a)-(m)) has switched resistance states so as to have a resistance that is below the specific low resistance level, a relatively large amount of read current (Iread) will flow through the first access transistor 340.1b to the source line 323 indicating R1 of the first variable resistor(s) is less than R2 of the second variable resistor(s). When the resistance of the first variable resistor 350.1 (or, if applicable, the resistances of all of the parallel-connected first variable resistors 350.1(a)-(m)) is/are maintained above the specific high resistance level, little or no read current (Iread) will flow through the first access transistor 340.1b to the source line 323 indicating R1 of the first variable resistor(s) is less than R2 of the second variable resistor(s).

To cause the second read process to be performed, read bias conditions can be applied to the bitline 321 and the source line 323, which are connected to the selected memory cell. The read bias conditions can include a relatively low positive voltage on the bitline 321 and discharging of the source line 323. In this case, however, the second read wordline 332 connected to the selected memory cell can be activated (i.e., a high positive voltage, such as VDD, can be applied to the second read wordline 332) in order to turn on the second access transistor 340.2b. All other read wordlines connected to the selected memory cell can be deactivated (e.g., discharged to ground) such that the other access transistors within the selected memory cell are all turned off. When the second variable resistor 350.2 (or, if applicable, any of the parallel-connected second variable resistors 350.2(a)-(m)) has switched resistance states so as to have a resistance that is below the specific low resistance level, a relatively large amount of read current (Iread) will flow through the second access transistor 340.2b to the source line 323. When the resistance of the second variable resistor 350.2 (or, if applicable, the resistances of the parallel-connected second variable resistors 350.2(a)-(m)) is/are maintained above the specific high resistance level, little or no read current (Iread) will flow through the second access transistor 340.1b to the source line 323.

The sense circuit 393 can be configured to sense any changes in current on the source line 323 during the above-described first and second read processes so that success of the previously performed write process can be confirmed. For example, the sense circuit 393 can include comparators 360 for the columns. Each comparator 360 can be connected to the source line 323 for a column and to a reference circuit (not shown) and can compare (i.e., can be adapted to compare, configured to compare, etc.) a read current (Iread) input from the source line 323 and a reference current (Iref) input from the reference circuit. Iref can be set at a predetermined current level that is between a first expected Iread when a variable resistor within a memory cell has a resistance that is above the specific high resistance level and a second expected Iread when the variable resistor has a resistance that is below the specific low resistance level. Therefore, if Iref is above the Iread input, then the output of the comparator 360 will indicate that none of the variable resistor(s) subjected to the read bias conditions during the read process is in the low resistance state; whereas, if Iref is below the Iread input, then the output of the comparator 360 will indicate that at least one of the variable resistor(s) subjected to the read bias conditions during the read bias conditions in the low resistance state.

The sense circuit 393 can further be configured to communicate the outputs of the comparator 360 from the first and second read processes to the controller 395 and the controller 395 can be configured to analyze the outputs to determine: (a) if the resistance state of any variable resistor in the selected memory cell was switched during the write process; and (b) if so, whether the resistance state of only first variable resistor(s) or second variable resistor(s) was switched such that the selected memory cell is now in the random programmed state and stores a bit. It should be noted that the logic value of the bit will depend on whether the first variable resistor 350.1 (or, if applicable, one or more of the parallel-connected first variable resistors 350.1(a)-(m)) or the second variable resistor 350.2 (or, if applicable, one or more of the parallel-connected second variable resistors) has switched resistance states (e.g., has switched to the low resistance state with a resistance that is below the low resistance level).

In exemplary embodiments, if the first variable resistor 350.1 has switched to the low resistance state (or, if applicable, if one or more of the parallel-connected first variable resistors 350.1(a)-(m) have switched to the low resistance state), the memory cell can be considered as storing a bit with a logic value of 1. In this same memory cell, the second variable resistor 350.2 will retain the high resistance state (or, if applicable, all of the parallel-connected second variable resistors will retain high resistance states). However, if the first variable resistor 350.1 retains the high resistance state (or, if applicable, if all of the parallel-connected first variable resistors retain high resistance states), then the memory cell can be considered as storing a bit with a logic value of 0. In this same memory cell, the second variable resistor 350.2 has switched to the low resistance state (or, if applicable, one or more of the parallel-connected second variable resistors 350.2(a)-(m) have switched to the low resistance state). In other words, if R1 of the first variable resistor(s)>R2 of the second variable resistor(s), then the stored bit will have a logic value of 0 and if R1<R2, then the stored bit will have a logic value of 1.

Optionally, operation of a selected memory cell 310A, 310B in the initialization mode can further include, when a write process is deemed to be unsuccessful (e.g., because none of the variable resistors switch states, because all of the variable resistors switch states, or because, in memory cell 310B a combination of first and second variable resistors switch states), repeating the write process with adjusted write bias conditions and further repeating the first and second read processes to confirm success of the subsequent write process. For example, if all of the variable resistors within the selected memory cell maintained their current resistance states (i.e., if none switched resistance states), then the write process could be repeated using a different positive voltage pulse with a higher voltage level and/or a longer duration. In other words, each memory cell could be subjected to a series of write processes with first and second read processes in between until the memory cell is determined to be successfully programmed. With each successive write process, the bias (i.e., the voltage level) can be fixed and the time (i.e., the pulse duration) can be increased, the time can be fixed, and the bias increased, or both the bias and the time can be increased. Very small incremental adjustments in the bias and/or time can be employed to try and capture small differences in resistance state switching thresholds due to minimal process variations. Following each write process, the first and second read processes can be repeated until it is determined that the write process has finally been successful (i.e., in memory cell 310A, the first variable resistor or the second variable resistor has switch to low resistance state; in the memory cell 310B, one or more first variable resistors or one or more second variable resistors but not a combination of both have switched to the low resistance state). Then, the initialization mode with respect to that memory cell can be terminated.

If all of the variable resistors (or, if in memory cell 310B, a combination of first and second variable resistors) within the selected memory cell switched resistance states, a reset process could be performed to reset all of the variable resistors to their original resistance states and then the write process could be repeated using a different positive voltage pulse with a lower voltage level and/or shorter duration. Optionally, when the write process is deemed unsuccessful either after the initial attempt or after one or more subsequent attempts, the selected memory cell can be flagged by the controller 395 as unavailable/faulty and bypassed during subsequent operations (e.g., during bitstring generation, discussed below).

Following initialization processing each memory cell 310A, 310B in the memory array will be in a random programmed state or, if applicable, flagged as unavailable/faulty. It should be understood that the "random programmed state" refers to the fact that the memory cell 310A, 310B has undergone successful one-time programming to store a bit, which randomly has either a logic value of 0 or a logic value of 1. Specifically, the logic value of the stored bit depends on whether the first variable resistor (or, if applicable, one or more parallel-connected first variable resistors) or the second variable resistor (or, if applicable, one or more of the parallel-connected second variable resistors) has the low resistance state. Since switching of the resistance state of only first variable resistor(s) or second variable resistor(s) in the presence of the same write bias conditions is due to random process variations, the condition that results in the stored bit in any given memory cell having a logic value of 0 or a logic value of 1 is random and unpredictable.

The controller 395 can further be configured to operate all memory cells 310A, 310B, which have successfully undergone one-time programming, in an operational read-only mode. Operating the memory cells 310A, 310B in an operational read-only mode can include causing read processes to be performed (e.g., in response to a challenge) in each of these memory cells to read out the stored bits in sequence in order to generate a unique bitstring.

For example, as mentioned above in exemplary embodiments, if a memory cell 310A, 310B in a random programmed state stores a bit with a logic value of 1, the first variable resistor 350.1 will have switched to the low resistance state (or, if applicable, one or more of the parallel-connected first variable resistors 350.1(a)-(m) will have switched to the low resistance state) and the second variable resistor 350.2 (or, if applicable, all of the parallel-connected second variable resistors 350.2(a)-(m)) will have maintained the high resistance state. If a memory cell 310A, 310B in a random programmed state stores a bit with a logic value of 0, the first variable resistor 350.1 will have maintained the high resistance state (or, if applicable, all of the parallel-connected first variable resistors 350.1(a)-(m) will have maintained the resistance state) and the second variable resistor 350.2 (or, if applicable, one or more of the parallel-connected second variable resistors 350.2(a)-(m)) will have switched to the low resistance state. Thus, operating memory cells 310A, 310B in the operational read-only mode can include causing each memory cell 310A, 310B to perform the same above-described read processes employed during the initialization mode to determine the stored bit. However, since in this case there are only two possible resistance states the first variable resistor(s) of a memory cell in the random programmed state will either have switched to the low resistance state or maintained the high resistance state, only the first read process is actually required to determine the value of the stored bit. That is, read bias conditions can be applied to the bitline 321 and the source line 323, which are connected to a selected memory cell. The first read wordline 331 connected to the selected memory cell can be activated. All other read wordlines connected to the selected memory cell can be deactivated. The comparator 360 connected to the source line 323 can then compare a read current (Iread) input from the source line 323 to a reference current (Iref) input. If Iref is above the Iread input (indicating that R1>R2), then the output of the comparator 360 will indicate a stored bit with a logic value of 0; whereas, if Iref is below the Iread input (indicating that R1<R2), then the output of the comparator 360 will indicate a stored bit with a logic value of 1. The stored bits from the memory cells can be read out in sequence to generate and output a unique bitstring.

Figure 5:
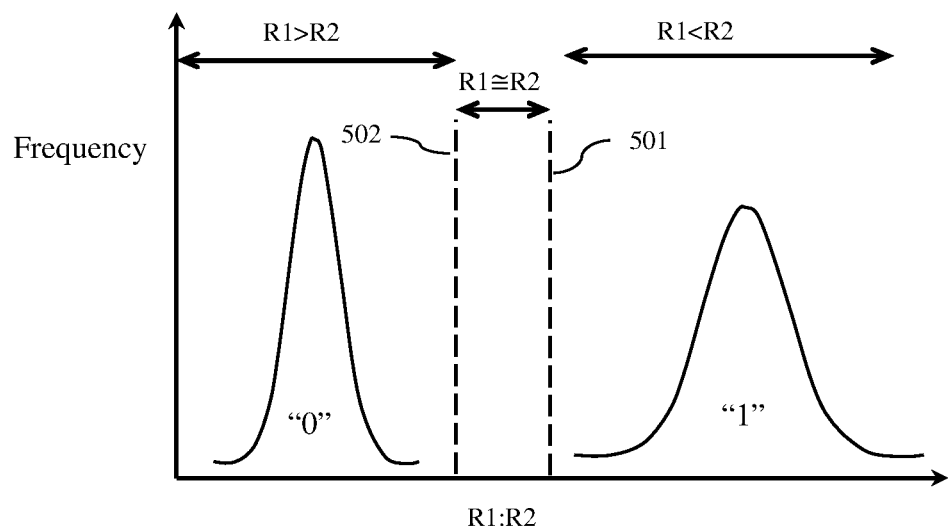
FIG. 5 is a graph illustrating that, with the circuit embodiments of FIGS. 3A and 3B, different resistance states of variable resistors of a memory cell in a programmed state will be so different that, even given different operating conditions, repeated and consistent generation of the same random number is achievable.

It should be noted that, once the memory cells 310A, 310B in the memory array are in the random programmed state, bit storage (whether the bit has a logic value of 1 or a logic value of 0) will be stable. That is, the same logic value will consistently be read out from a given memory cell each time the first read process is performed to read out the stored bit for inclusion in a bitstring during the operational read-only mode. This is because, as mentioned above and further as illustrated in the graph of FIG. 5, the resistance of a variable resistor in the high resistance state will be above some specific high resistance level 501 and the resistance of a variable resistor in the low resistance state will be below some specific low resistance level 502, which is less than the high resistance level 501. Furthermore, there is a relatively large difference between the high resistance level 501 and the low resistance level 502 such that in none of the programmed memory cells will R1 be approximately equal to R2. As a result, even when there are variations in operating conditions between repeated first read processes performed with respect to the same memory cell, there will be a very low probability that any changes in R1 or R2 will amount to a change in the resistance state or a read error.

Consequently, the above-described on-chip circuit 300A, 300B is configured to generate and output the exact same unique bitstring in response to repeated challenges and, thus, can be employed as a robust PUF.

As mentioned above, for purposes of illustration, the memory cells 310A, 310B in the circuit 300A, 300B were described above as incorporating variable resistors with two resistance states and, more particularly, as incorporating STT-MTJs.

However, it should be understood that in other embodiments, the variable resistors in the memory cells 310A, 310B of the circuit 300A, 300B could be PCM-type variable resistors or, alternatively, memristors that are specifically configured for switching between only two resistance states. For the initialization mode, the write bias conditions applied to the bitline and source line connected to memory cell and thereby concurrently applied to the two terminals of all variable resistors (which are initially within the same resistance state) when the common wordline connected to the memory cell is activated would be predetermined to achieve switching of only the first variable resistor or only the second variable resistor in the case of a memory cell 310A (or, if applicable, to achieve switching of only one or more of the parallel-connected first variable resistors or only one or more of the parallel-connected second variable resistors but not a combination of both in the case of a memory cell 310B) given the type of variable resistor and further given the probable existence of process variations. During the initialization mode, first and second read processes can also be formed, in the same manner as described above to, confirm success of the write process (i.e., to confirm success of the one-time programming). During operational read-only modes, stored bits can be read out of the memory cells in sequence in the same manner as described above in order to generate a unique bitstring.

It should also be understood that in still other embodiments, the variable resistors in the memory cells 310A, 310B of the circuit 300A, 300B could be memristors that are specifically configured for switching between more than two resistance states (e.g., three different resistance states, low (L), medium (M) or high (H)). In this case, different schemes could be employed during the initialization mode for programming a memory cell given the probable existence of random process variations, for determining whether the programming was successful, and for identifying the logic value of the stored bit. For example, if the variable resistors in the memory cells 310A of the circuit 300A are all memristors with three programmable resistance states, the initialization mode programming could begin with all memristors having the same high resistance state (H, H) and can designed so that at least the first variable resistor or the second variable resistor switches to the medium or low resistance state without both switching to the low resistance state. First and second read processes can be performed to determine the resistance states of the first and second variable resistors and to thereby confirm success of the programing. Different resulting combinations of resistance states in the first and second variable resistors (e.g., LM, LH, ML, MM, MH, HL, or HM) can represent different stored values (e.g., 0, 1, 2, 3, 4, 5, or 6) in a programmed memory cell. During operational read-only modes (e.g., in a PUF), stored values can be read out of the memory cells in sequence in order to generate a unique bitstring. That is, a memory cell can be selected, the first and second read process can be performed in the selected memory cell to determine the resistance states of the first and second variable resistors therein. The controller can capture these resistance states and can output a stored value that is represented by the combination. Then, the next memory cell in the sequence can be selected and so on.

Figure 6:
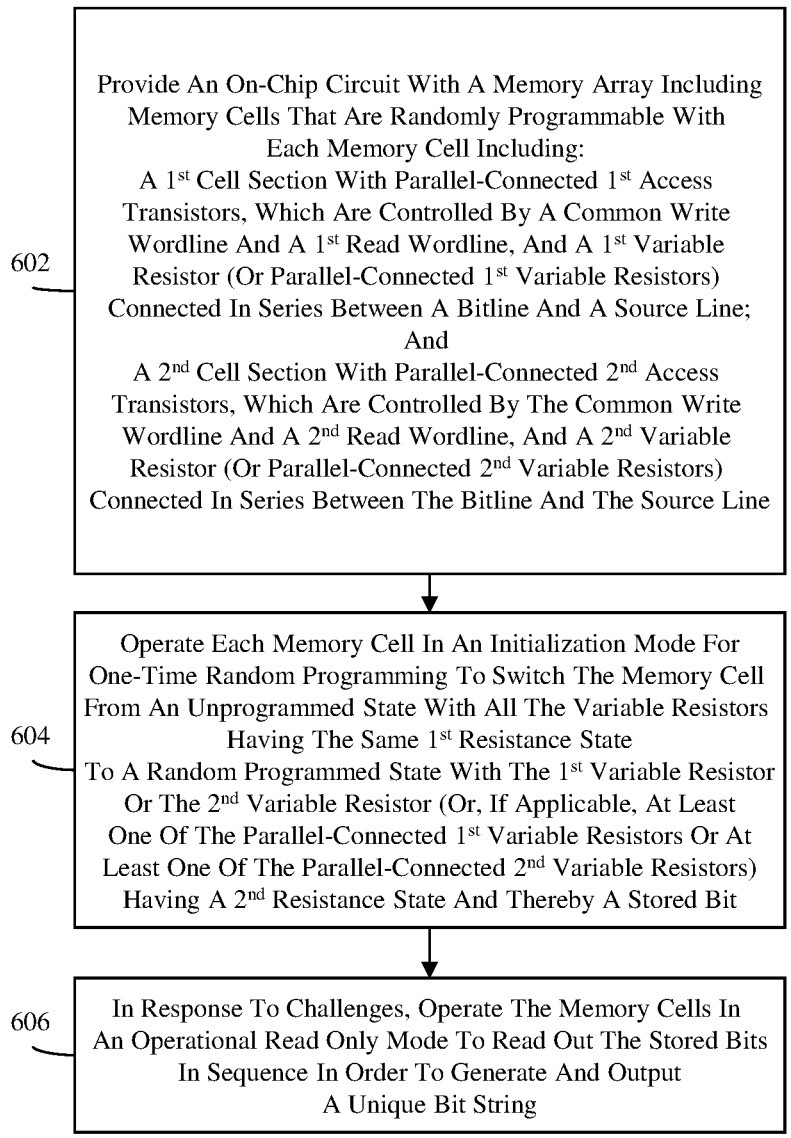
FIG. 6 is a flow diagram illustrating embodiments of an operating method.

Referring to the flow diagram of FIG. 6, disclosed herein are method embodiments for operating the above-described on-chip circuit 300A, 300B (e.g., Physically Unclonable Function (PUF)) and the memory cells 310A, 310B incorporated therein.

Specifically, the method embodiments can include providing an on-chip circuit 300A, 300B (see FIGS. 3A and 3B), which includes a memory array with multiple memory cells 310A, 310B that are arranged in columns A-N and rows a-n and that are randomly programmable (see process step 602).

As discussed in greater detail above, this circuit 300A, 300B can include bitlines 321 and source lines 323 for the columns and all the memory cells 310A, 310B in the same column can be connected to the bitline 321 and the source line 323 for that column. The circuit 300A, 300B can also include multiple wordlines (including a common write wordline 333, a first read wordline 331 and a second read wordline 332) for the rows and all of the memory cells 310, 310B in the same row can be connected to the wordlines for that row. The circuit 300A, 300B can further include a controller 395 and in communication with the controller 395, peripheral circuitry 391-392 and a sense circuit.

Each memory cell 310A, 310B can be a twin-cell memory cell (also referred to herein as a dual-cell memory cell) that includes a first cell section, which is connected between a bitline and a source line for a column, and a second cell section, which is connected the same bitline and the same source line for the column. Specifically, each memory cell 310A, 310B can include multiple two-terminal variable resistors and, particularly, one or more first variable resistors in the first cell section and one or more second variable resistors in the second cell section. For example, as illustrated in FIG. 3A, each memory cell 310A can include one first variable resistor 350.1 in the first cell section and one second variable resistor 350.2 in the second cell section. Alternatively, as illustrated in FIG. 3B, each memory cell 310B can include multiple parallel-connected first variable resistors 350.1(a)-(m) in the first cell section and multiple parallel-connected second variable resistors 350.2(a)-(m) in the second cell section.

In some embodiments, the two-terminal variable resistors in each memory cell 310A, 310B are spin transfer torque-type magnetic tunnel junctions (STT-MTJs). In other embodiments, different types of two-terminal variable resistors (e.g., phase change memory-type variable resistors, memristors, etc.) could, alternatively, be incorporated into the memory cell 310A, 310B. For purposes of illustration, the method is described in greater detail below and with respect to circuit operation when the memory cells include STT-MTJs. Each memory cell 310A, 310B can further include multiple access transistors including two parallel-connected first access transistors 340.1a-b in the first cell section and two parallel-connected second access transistors 340.2a-b in the second cell section. The access transistors can all be, for example, n-type field effect transistors (NFETs). In each memory cell 310A, 310B in a given column and row, the parallel-connected first access transistors 340.1a-b and the first variable resistor 350.1 (or, if applicable, the parallel-connected first variable resistors 350.1(a)-(m)) can be connected in series between the bitline 321 and the source line 323 for the column. Additionally, the parallel-connected second access transistors 340.2a-b and the second variable resistor 350.2 (or, if applicable, the parallel-connected second variable resistors 350.2(a)-(m)) can be connected in series between the same bitline 321 and the same source line 323 for the column. Additionally, in each memory cell 310A, 310B in a given column and row, the gates of the two parallel-connected first access transistors 340.1a-b can be connected to the common write wordline 333 and to the first read wordline 331, respectively, for the row. The gates of the two parallel-connected second access transistors 340.2a-b can be connected to the same common write wordline 333 and to a second read wordline 332, respectively, for the row.

The method embodiments can further include operating the on-chip circuit 300A, 300B as a PUF for consistently generating and outputting the exact same random number (i.e., the exact same unique bitstring) in response to repeated challenges.

To accomplish this, the method embodiments can first include selectively operating (e.g., by the controller 395) each memory cell 310A, 310B in an initialization mode prior to allowing any read only functions to be performed for bitstring generation (see process step 604).

Operation of a selected memory cell 310A, 310B in the initialization mode at process step 604 can include performing a write process in the selected memory cell 310A, 310B in order to achieve one-time programming of that memory cell from an unprogrammed state with no stored bit to a random programmed state with a stored bit (where the 0 or 1 logic value of the stored bit is a function of random process variations and, thus, random and unknowable prior to completion of the one-time programming).

Specifically, in the circuit 300A, 300B provided at process step 602, all of the memory cells 310A, 310B can be in an unprogrammed state. That is, in each memory cell, the multiple variable resistors of a memory cell can all have the same first resistance state so that no bit is stored therein. For example, consider STT-MTJs which are typically manufactured on a chip in a manner that results in all of the STT-MTJs initially being in the RAP state. Thus, when the memory cells 310A, 310B of the circuit 300A, 300B incorporate STT-MTJs as the variable resistors, each memory cell 310A, 310B will initially have an unprogrammed state with all of the STT-MTJs being in the RAP state or, more particularly, in the same high resistance state with resistances above a specific high resistance level.

To perform the write process in a selected memory cell 310A, 310B, limited write bias conditions (as discussed in greater detail below) can be applied to the bitline 321 and the source line 323, which are connected to the selected memory cell, and the common write wordline 333 connected to the selected memory cell can be activated (i.e., a high positive voltage, such as VDD, can be applied to the common write wordline 333) in order to concurrently turn on one first access transistor 340.1a and one second access transistor 340.2a and, thereby concurrently apply the limited write bias conditions to the first variable resistor 350.1 (or, if applicable, to the parallel-connected first variable resistors 350.1(a)-(m)) and to the second variable resistor 350.2 (or, if applicable, to the parallel connected second variable resistors 350.2(a)-(m)).

During this write process, the first read wordline 331 and the second read wordline 332 can remain deactivated (e.g., discharged to ground) so that the other first and second access transistors 340.1b and 340.2b remain turned off. For a memory cell 310A, the limited write bias conditions can be predetermined, given the likely existence of random process variations, so that they cause only the first variable resistor 350.1 or the second variable resistor 350.2, but not both, to switch resistance states to a second resistance state that is different from the first resistance state. For a memory cell 310B, the limited write bias conditions can be predetermined, given the likely existence of random process variations, so that at least one of the first variable resistors 350.1(a)-(m) or at least one of the second variable resistors 350.2 (a)-(m), but not a combination of both first and second variable resistors, switch resistance states to the second resistance state. Thus, in either memory cell 310A, 310B, the limited write bias conditions applied during the write process can be selected so that the result of the programming process will be either: R1 of the first variable resistor(s) is less than R2 of the second variable resistor(s) or R1 of the first variable resistor(s) is greater than R2 of the second variable resistor(s).

Operation of a selected memory cell 310A, 310B in the initialization mode at process step 604 can also include performing discrete read processes in the selected memory cell in order to confirm success of the write process and, thereby confirm the status of the selected memory cell as being in the random programmed state. Specifically, operation of the selected memory cell 310A, 310B in the initialization mode can include performing both a first read process associated with the first variable resistor(s) and a second read process associated with the second variable resistor(s).

During the first read process, read bias conditions can be applied to the bitline 321 and the source line 323, which are connected to the selected memory cell. The read bias conditions can include a relatively low positive voltage on the bitline 321 and discharging of the source line 323. The first read wordline 331 connected to the selected memory cell can be activated (i.e., a high positive voltage, such as VDD, can be applied to the first read wordline 331) in order to turn on the first access transistor 340.1b. All other read wordlines connected to the selected memory cell can be deactivated (e.g., discharged to ground) such that the other access transistors within the selected memory cell are all turned off. When the first variable resistor 350.1 (or, if applicable, any of the parallel-connected first variable resistors 350.1(a)-(m)) has switched resistance states so as to have a resistance that is below the specific low resistance level, a relatively large amount of read current (head) will flow through the first access transistor 340.1b to the source line 323 indicating R1 of the first variable resistor(s) is less than R2 of the second variable resistor(s). When the resistance of the first variable resistor 350.1 (or, if applicable, the resistances of all of the parallel-connected first variable resistors 350.1(a)-(m)) is/are maintained above the specific high resistance level, little or no read current (head) will flow through the first access transistor 340.1b to the source line 323 indicating R1 of the first variable resistor(s) is less than R2 of the second variable resistor(s).

During the second read process, read bias conditions can be applied to the bitline 321 and the source line 323, which are connected to the selected memory cell. The read bias conditions can include a relatively low positive voltage on the bitline 321 and discharging of the source line 323. In this case, however, the second read wordline 332 connected to the selected memory cell can be activated (i.e., a high positive voltage, such as VDD, can be applied to the second read wordline 332) in order to turn on the second access transistor 340.2b. All other read wordlines connected to the selected memory cell can be deactivated (e.g., discharged to ground) such that the other access transistors within the selected memory cell are all turned off. When the second variable resistor 350.2 (or, if applicable, any of the parallel-connected second variable resistors 350.2(a)-(m)) has switched resistance states so as to have a resistance that is below the specific low resistance level, a relatively large amount of read current (head) will flow through the second access transistor 340.2b to the source line 323. When the resistance of the second variable resistor 350.2 (or, if applicable, the resistances of the parallel-connected second variable resistors 350.2(a)-(m)) is/are maintained above the specific high resistance level, little or no read current (head) will flow through the second access transistor 340.1b to the source line 323.

The above-described first and second read processes can both include sensing (e.g., using a comparator 360) any changes in current on the source line 323 as a result of first read process and as a result of the second read process so that success of the previously performed write process can be confirmed. For example, during each read process, a read current (Iread) input from the source line 323 and a reference current (Iref) input from the reference circuit can be compared (e.g., by a comparator). Iref can be set at a predetermined current level that is between a first expected Iread when a variable resistor within a memory cell has a resistance that is above the specific high resistance level and a second expected Iread when the variable resistor has a resistance that is below the specific low resistance level. Therefore, if Iref is above the Iread input, then the output of the comparator 360 will indicate that none of the variable resistor(s) subjected to the read bias conditions during the read process is in the low resistance state; whereas, if Iref is below the Iread input, then the output of the comparator 360 will indicate that at least one of the variable resistor(s) subjected to the read bias conditions during the read bias conditions in the low resistance state.

Additional initialization mode processing at process step 604 can include comparing (e.g., by the controller 395, which is in communication with the comparator 360), the comparator outputs from the first and second read processes to determine: (a) if the resistance state of any variable resistor in the selected memory cell was switched during the write process; and (b) if so, whether the resistance state of only first variable resistor(s) or second variable resistor(s) was switched such that the selected memory cell is now in the random programmed state and stores a bit. It should be noted that the logic value of the bit will depend on whether the first variable resistor 350.1 (or, if applicable, one or more of the parallel-connected first variable resistors 350.1(a)-(m)) or the second variable resistor 350.2 (or, if applicable, one or more of the parallel-connected second variable resistors) has switched resistance states (e.g., has switched to the low resistance state with a resistance that is below the low resistance level). In exemplary embodiments, if the first variable resistor 350.1 has switched to the low resistance state (or, if applicable, if one or more of the parallel-connected first variable resistors 350.1(a)-(m) have switched to the low resistance state), the memory cell can be considered as storing a bit with a logic value of 1. However, if the first variable resistor 350.1 retains the high resistance state (or, if applicable, if all of the parallel-connected first variable resistors retain high resistance states), then the memory cell can be considered as storing a bit with a logic value of 0. In other words, if R1 of the first variable resistor(s)>R2 of the second variable resistor(s), then the stored bit will have a logic value of 0 and if R1<R2, then the stored bit will have a logic value of 1.

Optionally, additional initialization mode processing at process step 604 can include, when a write process is deemed to be unsuccessful, repeating the write process with adjusted write bias conditions (e.g., with a higher bias voltage and/or longer pulse duration) and further repeating the first and second read processes to confirm success of the subsequent write process. In other words, a memory cell could be subjected to a series of write processes with first and second read processes in between until the memory cell is determined to be successfully programmed. With each successive write process, the bias (i.e., the voltage level) can be fixed and the time (i.e., the pulse duration) can be increased, the time can be fixed, and the bias increased, or both the bias and the time can be increased. Very small incremental adjustments in the bias and/or time can be employed to try and capture very small differences in resistance state switching thresholds due to minimal process variations. Following each write process, the first and second read processes can be repeated until it is determined that the write process has finally been successful (i.e., in memory cell 310A, the first variable resistor or the second variable resistor has switch to low resistance state; in the memory cell 310B, one or more first variable resistors or one or more second variable resistors but not a combination of both have switched to the low resistance state). Then, the initialization mode with respect to that memory cell can be terminated.

Optionally, additional initialization processing at process step 604 can also include, when the write process is deemed unsuccessful either after the initial attempt or after one or more subsequent attempts, flagging the selected memory cell as unavailable/faulty so that it is biased during subsequent operations (e.g., during bitstring generation, discussed below).

The method embodiments can further, following initialization processing at process step 604, operating (e.g., by the controller 395) all memory cells 310A, 310B, which have successfully undergone one-time programming, in an operational read-only mode (see process step 606). Operating the memory cells 310A, 310B in an operational read-only mode can include performing read processes (e.g., in response to a challenge) in each of these memory cells to read out the stored bits in sequence in order to generate a unique bitstring.

For example, as mentioned above in exemplary embodiments, if a memory cell 310A, 310B in a random programmed state stores a bit with a logic value of 1, the first variable resistor 350.1 will have switched to the low resistance state (or, if applicable, one or more of the parallel-connected first variable resistors 350.1(a)-(m) will have switched to the low resistance state). If a memory cell 310A, 310B in a random programmed state stores a bit with a logic value of 0, the first variable resistor 350.1 will have maintained the high resistance state (or, if applicable, all of the parallel-connected first variable resistors 350.1(a)-(m) will have maintained the resistance state). Thus, operating memory cells 310A, 310B in the operational read-only mode can include performing the same above-described first read process employed during the initialization mode. That is, read bias conditions can be applied to the bitline 321 and the source line 323, which are connected to a selected memory cell. The first read wordline 331 connected to the selected memory cell can be activated. All other read wordlines connected to the selected memory cell can be deactivated. The read current (Iread) input from the source line 323 can be compared to the reference current (Iref) input. If Iref is above the Iread input (indicating that R1>R2), then the output of the comparator 360 to the controller 395 will indicate a stored bit with a logic value of 0; whereas, if Iref is below the Iread input (indicating that R1<R2), then the output of the comparator 360 to the controller 395 will indicate a stored bit with a logic value of 1. The stored bits from the memory cells can be read out in sequence (e.g., by the controller 395), thereby generating and outputting a unique bitstring.

It should be noted that, one the memory cells 310A, 310B in the memory array are in the random programmed state following process step 604, bit storage (whether the bit has a logic value of 1 or a logic value of 0) will be stable. That is, the same logic value will consistently be read out from a given memory cell each time the first read process is performed to read out the stored bit for inclusion in a bitstring during the operational read-only mode. This is because, as mentioned above and further as illustrated in the graph of FIG. 5, the resistance of a variable resistor in the high resistance state will be above some specific high resistance level 501 and the resistance of a variable resistor in the low resistance state will be below some specific low resistance level 502, which is less than the high resistance level 501. Furthermore, there is a relatively large difference between the high resistance level 501 and the low resistance level 502 such that in none of the programmed memory cells will R1 be approximately equal to R2. As a result, even when there are variations in operating conditions between repeated first read processes performed with respect to the same memory cell, there will be a very low probability that any changes in R1 or R2 will amount to a change in the resistance state or a read error. Consequently, at process step 606, the exact same unique bitstring can be generated and output in response to repeated challenges.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A memory cell comprising:
   multiple variable resistors comprising: a first variable resistor; and a second variable resistor; and
   multiple transistors comprising: two parallel-connected first transistors; and two parallel-connected second transistors, wherein the first transistors and the first variable resistor are connected in series between a bitline and a source line and the first transistors have gates connected to a common write wordline and to a first read wordline, respectively, and wherein the second transistors and the second variable resistor are connected in series between the bitline and the source line and the second transistors have gates connected to the common write wordline and to a second read wordline, respectively.

2. The memory cell of claim 1,
   wherein the memory cell is operable in an initialization mode for one-time programming from an unprogrammed state to a random programmed state,
   wherein, in the unprogrammed state, the multiple variable resistors are all in a first resistance state,
   wherein, in the random programmed state, one of the first variable resistor and the second variable resistor is in a second resistance state that is different from the first resistance state and the memory cell stores a bit with a logic value that is dependent on whether the first variable resistor is in the second resistance state, and
   wherein, when operating in the initialization mode, the memory cell performs a write process comprising: in response to write bias conditions on the bitline and the source line and to activation of the common write wordline and further given existence of random process variations, switching one variable resistor of the multiple variable resistors to the second resistance state.

3. The memory cell of claim 2, wherein the random process variations are determinative of which one of the multiple variable resistors switches to the second resistance state such that the logic value of the bit is unknowable prior to the one-time programming.

4. The memory cell of claim 2, wherein, when operating in the initialization mode, the memory cell further performs a first read process and a second read process using the first read wordline and the second read wordline, respectively, to confirm success of the write process.

5. The memory cell of claim 2,
   wherein the first variable resistor comprises a first spin transfer torque-type magnetic tunnel junction and the second variable resistor comprises a second spin transfer torque-type magnetic tunnel junction,
   wherein the first resistance state is a high resistance state associated with a resistance above a high resistance level and the second resistance state is a low resistance state associated with a resistance below a low resistance level that is less than the high resistance level, and
   wherein the write bias conditions comprise: a particular positive voltage pulse on the bitline and discharge of the source line to ground.

6. The memory cell of claim 1, wherein the variable resistors comprise any of spin transfer torque-type magnetic tunnel junctions, phase change memory-type variable resistors, and memristors.

7. The memory cell of claim 1,
   wherein the multiple variable resistors comprise:
     first variable resistors connected in parallel between the first transistors and the source line; and
     second variable resistors connected in parallel between the second transistors and the source line,
   wherein the memory cell is operable in an initialization mode for one-time programming from an unprogrammed state to a random programmed state,
   wherein, in the unprogrammed state, the multiple variable resistors are all in a first resistance state, and
   wherein, in the random programmed state, at least one of the first variable resistors or at least one of the second variable resistors is in a second resistance state that is different from the first resistance state and the memory cell stores a bit with a logic value that is dependent on whether any of the first variable resistors are in the second resistance state,
   wherein, when operating in the initialization mode, the memory cell performs a write process comprising: in response to write bias conditions on the bitline and the source line and to activation of the common write wordline and further given existence of random process variations, switching the at least one of the first variable resistors or the at least one of the second variable resistors to the second resistance state, and
   wherein the random process variations are determinative of which of the multiple variable resistors switch to the second resistance state such that the logic value of the bit is unknowable prior to the one-time programming.

8. A circuit comprising:
   an array of memory cells arranged in columns and rows, wherein each memory cell comprises:
     multiple variable resistors comprising: a first variable resistor; and a second variable resistor; and
     multiple transistors comprising: two parallel-connected first transistors; and two parallel-connected second transistors, wherein the first transistors and the first variable resistor are connected in series between a bitline and a source line and the first transistors have gates connected to a common write wordline and to a first read wordline, respectively, and wherein the second transistors and the second variable resistor are connected in series between the bitline and the source line and the second transistors have gates connected to the common write wordline and to a second read wordline, respectively.

9. The circuit of claim 8,
   wherein the circuit further comprises: peripheral circuitry operably connected to the bitline and the source line for each of the columns and to the common write wordline, the first read wordline and the second read wordline for each of the rows; and a controller in communication with the peripheral circuitry,
   wherein the peripheral circuitry is configured to cause operation of each memory cell in an initialization mode in response to control signals from the controller, wherein the operation of the memory cell in the initialization mode comprises causing a write process to be performed in the memory cell to achieve one-time programming of the memory cell from an unprogrammed state to a random programmed state, wherein, in the unprogrammed state, the multiple variable resistors of the memory cell are all in a first resistance state, wherein, in the random programmed state, one of the first variable resistor and the second variable resistor is in a second resistance state that is different from the first resistance state and the memory cell stores a bit with a logic value that is dependent on whether the first variable resistor is in the second resistance state, and wherein the write process in the memory cell is caused by application of write bias conditions to the bitline and the source line connected to the memory cell and activation of the common write wordline connected to the memory cell such that, in response to the write bias conditions and to activation of the common write wordline and further given existence of random process variations in the memory cell, one variable resistor of the multiple variable resistors within the memory cell switches to the second resistance state, wherein the peripheral circuitry is further configured to cause operation of the memory cells that have been programmed into the random programmed state in operational read-only modes in response to additional control signals from the controller, wherein the operation of the memory cells in the operational read-only mode comprises performing read processes to read out stored bits from the memory cells in sequence, and wherein the controller is further configured to generate and output a bitstring using the stored bits.

10. The circuit of claim 9, wherein the random process variations are determinative of which one of the multiple variable resistors switches to the second resistance state such that the logic value of the bit is unknowable prior to the one-time programming.

11. The circuit of claim 9, wherein the operation of the memory cell in the initialization mode further comprises causing a first read process and a second read process to be performed in the memory cell using the first read wordline and the second read wordline, respectively, connected to the memory cell to confirm success of the write process.

12. The circuit of claim 9,
wherein, in each memory cell, the first variable resistor comprises a first spin transfer torque-type magnetic tunnel junction and the second variable resistor comprises a second spin transfer torque-type magnetic tunnel junction,
wherein the first resistance state is a high resistance state associated with a resistance above a high resistance level and the second resistance state is a low resistance state associated with a resistance below a low resistance level that is less than the high resistance level, and
wherein the write bias conditions comprise: a particular positive voltage pulse on the bitline and discharge of the source line to ground.

13. The circuit of claim 8, wherein, in each memory cell, the multiple variable resistors comprise any of spin transfer torque-type magnetic tunnel junctions, phase change memory-type variable resistors and memristors.

14. The circuit of claim 8,
wherein the multiple variable resistors in each memory cell comprise:
first variable resistors connected in parallel between the first transistors and the source line; and
second variable resistors connected in parallel between the second transistors and the source line, and
wherein the circuit is configured to operate each memory cell in an initialization mode,
wherein operation of each memory cell in the initialization mode comprises causing a write process to be performed in the memory cell to achieve one-time programming of the memory cell from an unprogrammed state to a random programmed state,
wherein, in the unprogrammed state, the multiple variable resistors of the memory cell are all in a first resistance state,
wherein, in the random programmed state, at least one of the first variable resistors or at least one of the second variable resistors is in a second resistance state that is different from the first resistance state and the memory cell stores a bit with a logic value that is dependent on whether any of the first variable resistors have the second resistance state,
wherein the causing of the write process to be performed in the memory cell comprises: applying write bias conditions to the bitline and the source line connected to the memory cell and activating the common write wordline connected to the memory cell such that, in response to the write bias conditions and to activation of the common write wordline and further given existence of random process variations in the memory cell, switching the at least one of the first variable resistors or the at least one of the second variable resistors to the second resistance state,
wherein the random process variations are determinative of which of the multiple variable resistors switch to the second resistance state such that the logic value of the bit is unknowable prior to the one-time programming, and
wherein the circuit is further configured to operate all memory cells that have been programmed into the random programmed state in an operational read-only mode to cause stored bits to be read out from the memory cells in sequence to generate a bitstring.

15. A method comprising:
providing an array of memory cells arranged in columns and rows, wherein each memory cell comprises:
multiple variable resistors comprising: a first variable resistor; and a second variable resistor; and
multiple transistors comprising: two parallel-connected first transistors; and two parallel-connected second transistors, wherein the first transistors and the first variable resistor are connected in series between a bitline and a source line and the first transistors have gates connected to a common write wordline and to a first read wordline, respectively, and wherein the second transistors and the second variable resistor are connected in series between the bitline and the source line and the second transistors have gates connected to the common write wordline and to a second read wordline, respectively; and
operating each memory cell in an initialization mode, wherein the operating of the memory cell in the initialization mode comprises: causing a write process to be performed to achieve one-time programming of the memory cell from an unprogrammed state to a random programmed state by applying write bias conditions on the bitline and the source line connected the memory cell and activating the common write wordline connected to the memory cell such that, in response to the write bias conditions and activation of the common write wordline and further given existence of random process variations in the memory cell, the memory cell switches from the unprogrammed state to the random programmed state.

16. The method of claim 15,
wherein the operating of each memory cell in the initialization mode further comprises causing a first read process and a second read process to be performed in the memory cell using the first read wordline and the second read wordline, respectively, connected to the memory cell to confirm success of the write process, and
wherein the method further comprises operating all of the memory cells that have been programmed into the random programmed state in an operational read-only mode to cause stored bits to be read out from the memory cells in sequence to generate a bitstring.

17. The method of claim 16,
wherein, in the unprogrammed state, the multiple variable resistors of the memory cell are all in a first resistance state,
wherein, in the random programmed state, one of the first variable resistor and the second variable resistor is in a second resistance state that is different from the first resistance state and the memory cell stores a bit with a logic value that is dependent on whether the first variable resistor is in the second resistance state,
wherein, in response to application of the write bias conditions on the bitline and the source line and to activation of the common write wordline and further given the existence of the random process variations, only one variable resistor of the multiple variable resistors switches to the second resistance state, and
wherein the random process variations are determinative of which one of the multiple variable resistors switches to the second resistance state such that the logic value of the bit is unknowable prior to the one-time programming.

18. The method of claim 17,
wherein the first variable resistor comprises a first spin transfer torque-type magnetic tunnel junction and the second variable resistor comprises a second spin transfer torque-type magnetic tunnel junction,
wherein the first resistance state is a high resistance state associated with a resistance above a high resistance level and the second resistance state is a low resistance state associated with a resistance below a low resistance level that is less than the high resistance level, and
wherein the write bias conditions comprise: a particular positive voltage pulse on the bitline and discharge of the source line to ground.

19. The method of claim 17, wherein, in each memory cell, the multiple variable resistors comprise any of spin transfer torque-type magnetic tunnel junctions, phase change memory-type variable resistors and memristors.

20. The method of claim 16,
wherein the multiple variable resistors in each memory cell comprise:
first variable resistors connected in parallel between the two parallel-connected first transistors and the source line; and
second variable resistors connected in parallel between the two parallel-connected second transistors and the source line, and
wherein, in the unprogrammed state, the multiple variable resistors of the memory cell are all in a first resistance state,
wherein, in the random programmed state, at least one of the first variable resistors or at least one of the second variable resistors is in a second resistance state that is different from the first resistance state and the memory cell stores a bit with a logic value that is dependent on whether any of the first variable resistors are in the second resistance state,
wherein, in response to application of the write bias conditions on the bitline and the source line and to activation of the common write wordline and further given the existence of the random process variations, the at least one of the first variable resistors or the at least one of the second variable resistors switches to the second resistance state, and
wherein the random process variations are determinative of which of the multiple variable resistors switch to the second resistance state such that the logic value of the bit is unknowable prior to the one-time programming.

* * * * *